(No Model.)
A. E. BARBER.
WATERING TROUGH FOR ANIMALS.
No. 315,697. Patented Apr. 14, 1885.
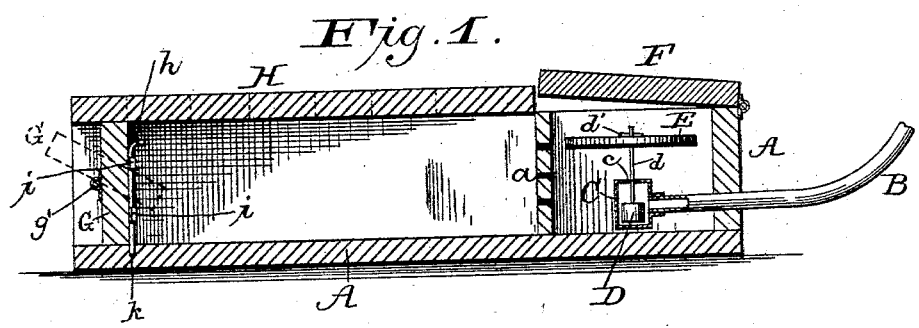
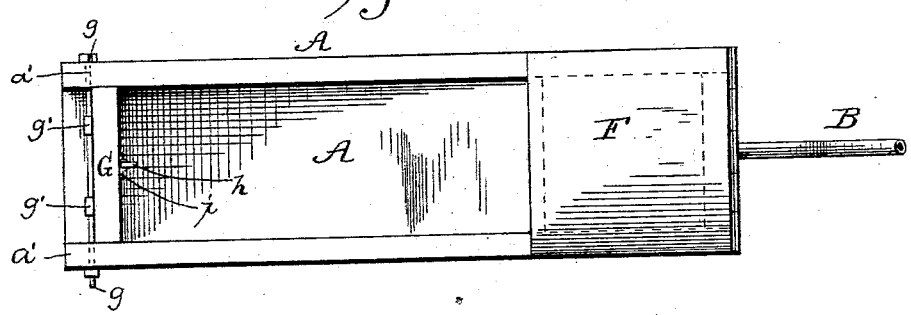
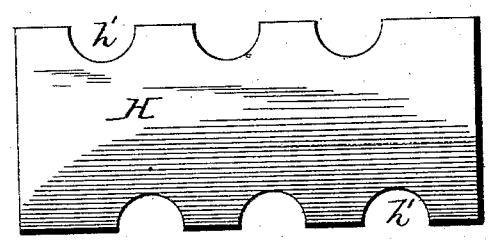
Witnesses:
F. Burnham
Chas. F. Benjamin
Inventor:
Albert E. Barber,
By McFarland & Benjamin
Att'ys.

UNITED STATES PATENT OFFICE.

ALBERT E. BARBER, OF McDOWELL, ILLINOIS.

WATERING-TROUGH FOR ANIMALS.

SPECIFICATION forming part of Letters Patent No. 315,697, dated April 14, 1885.

Application filed June 10, 1884. (No model.)

*To all whom it may concern:*

Be it known that I, ALBERT E. BARBER, a citizen of the United States, residing at McDowell, in the county of Livingston and State of Illinois, have invented certain new and useful Improvements in Watering-Troughs for Animals; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of drinking-troughs wherein the supply of water is regulated by a float-valve; and its object is to combine in an efficient yet simple manner the means of such a supply with means for keeping the water practically pure while in the trough, and for simply and efficiently cleansing the trough as often as may be necessary. This object I accomplish by connecting with an ordinary trough the supply-pipe, stop valve, and float common to such devices as the one herein described, and giving to the lower end wall of the trough a tilting motion by means of a hinge, so that the trough may be thoroughly "flushed" as often as the bottom or sides thereof may become foul.

In the accompanying drawings, wherein like letters represent like parts, Figure 1 is a longitudinal section of the trough; Fig. 2, a top plan of the same, and Fig. 3 a small top plan of the cover of the trough.

A A are the bottom, upper end, and sides of an ordinary watering-trough, which is divided by a perforated partition, a, into two unequal compartments, of which the smaller serves as the valve-chamber and the larger as the drinking-tank. A supply-pipe, B, conveys water into the trough, and is closed by a T-cap, C, provided with an orifice, c, for the escape of the water. A cylindrical valve, D, of larger diameter than the said orifice, rests normally at the base of the T-cap, and is attached to a rod, d, which projects through and above the orifice. A floating disk, E, slides upon the rod, and is held by the key d', which is passed through one of a series of eyes formed in and near the top of the rod. A similar key or any other suitable device may be used below the float, if desired, to limit the motion of the latter upon the rod. A hinged lid, F, fits upon the valve-chamber to protect the mechanism contained therein.

It is obvious that as the water flows in through the supply-pipe the float will gradually rise till the valve first impedes the flow at the mouth of the pipe, and finally checks it at the orifice of the cap, and that, as the level of the water within the tank falls, the valve will sink with it until the orifice of the cap and the mouth of the pipe are free to discharge fresh supplies of water. The lower end wall, G, of the trough is detached from the adjacent parts, and held in place by a bolt, g, which passes through eyes a' in the sides of the tank, and through staples g' in the outer side and center of said end wall. It will be readily understood that by the tilting of this end wall the trough can be cleansed as often as desired by flushing with water or scrubbing. It will be also understood that the perforated partition a will protect the valve mechanism against obstruction from any solid matters getting into the drinking-tank.

In order that the end wall may not be accidentally tilted, a bolt, h, passes through staples i in the inner side of the wall, and fits into a socket, k, in the floor of the tank. Leakage at the bottom and sides of the end wall and through the eyes a' may be prevented by the use of elastic packing in the ordinary manner, and the bottom and sides of the trough are prolonged slightly beyond the end wall, in order that cleats may be used to support the packing-strips, if desired. A lid, H, having half-circular recesses h' in the edges thereof, covers the drinking-tank, while allowing animals access to the water.

I do not confine myself to any particular materials for the construction of the several parts of my invention, but purpose to use any that are suitable to the uses described.

Having thus fully described my invention, what I claim to be new and useful, and desire to secure by Letters Patent, is the following:

A watering-trough for animals, consisting in the combination of the ordinary bottom, sides, and upper end wall of such a machine with a pivoted end gate, a lid suitably provided with drink-holes, a perforated cross-partition between the end walls, and a water-pipe provided at the exit end with a cut-off valve governed by a float, all constructed and arranged in the manner hereinbefore described, and for the purposes set forth.

In testimony whereof I affix my signature in presence of two witnesses.

ALBERT E. BARBER.

Witnesses:
WM. T. PINDLE,
M. DIMMICK.